Figure 1:
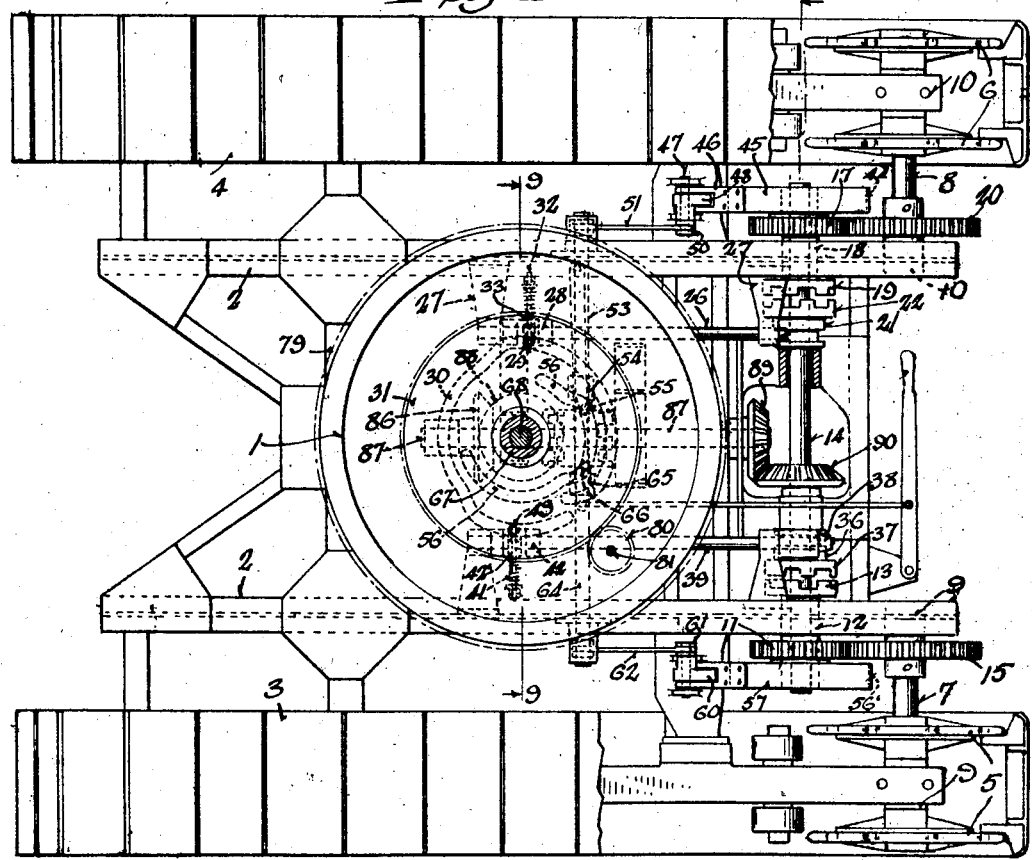

Nov. 13, 1928.

A. G. HENRICKS ET AL

STEERING GEAR

Filed Jan. 26, 1925   3 Sheets-Sheet 1

INVENTORS:
ARTHUR G. HENRICKS
AND HOLGER L. MITCHELL
BY Bottum, Hudnall, Leckie & McKenzie
ATTORNEYS Nov. 13, 1928.  
A. G. HENRICKS ET AL  
1,691,062  
STEERING GEAR  
Filed Jan. 26, 1925   3 Sheets-Sheet 2
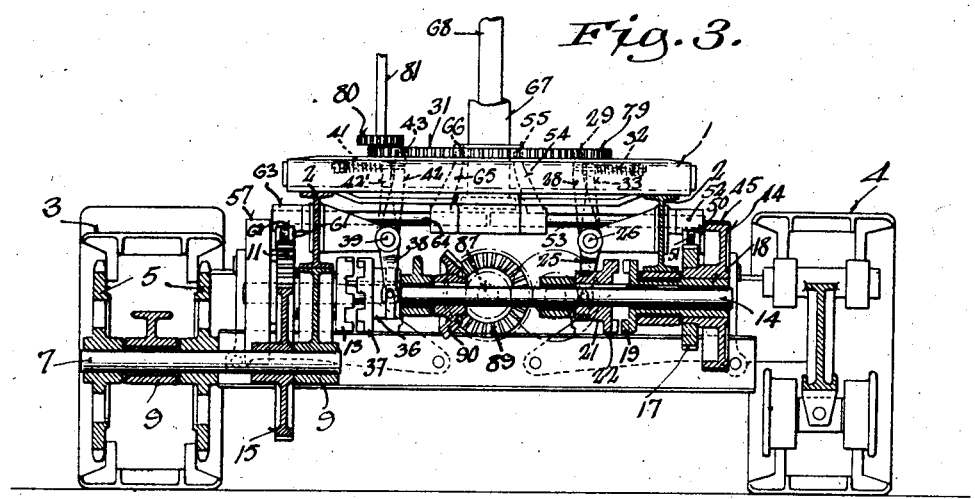
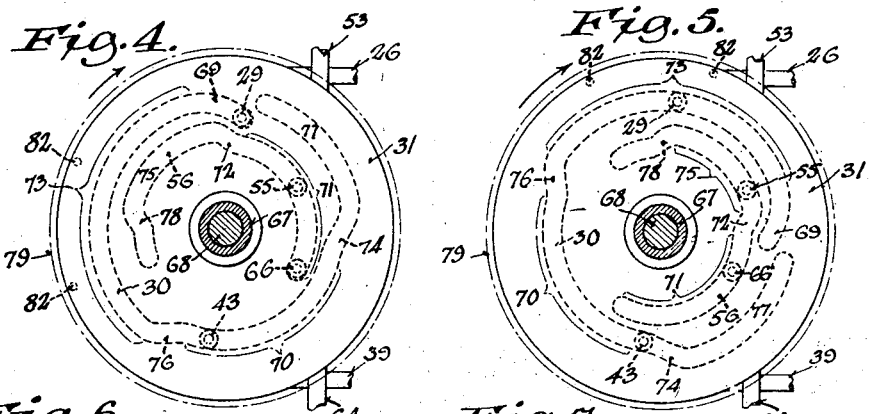
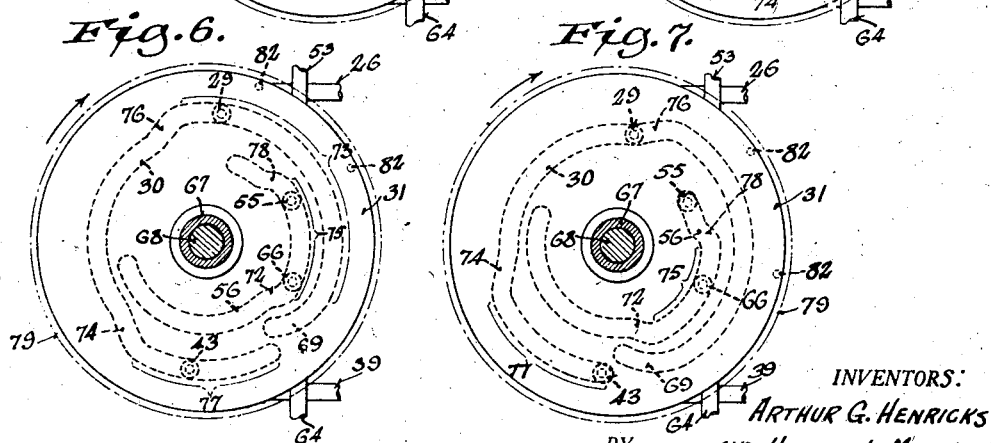
INVENTORS:  
ARTHUR G. HENRICKS  
AND HOLGER L. MITCHELL  
BY  
ATTORNEYS.

Nov. 13, 1928. 1,691,062
A. G. HENRICKS ET AL
STEERING GEAR
Filed Jan. 26, 1925 3 Sheets-Sheet 3

INVENTORS:
ARTHUR G. HENRICKS
AND HOLGER L. MITCHELL
BY
Bottum, Hadsell, Coakin and McNamara.
ATTORNEYS.

Patented Nov. 13, 1928.

1,691,062

UNITED STATES PATENT OFFICE.

ARTHUR G. HENRICKS AND HOLGER L. MITCHELL, OF MILWAUKEE, WISCONSIN, ASSIGNORS TO HARNISCHFEGER CORPORATION, OF MILWAUKEE, WISCONSIN, A CORPORATION OF WISCONSIN.

STEERING GEAR.

Application filed January 26, 1925. Serial No. 4,800.

This invention relates to improvements in steering gear and more particularly to steering gear for endless belt tractors such as used for instance for excavator cranes of the so-called full revolving type.

Tractors of this type are peculiarly adapted to support excavating machinery such as excavator cranes, dragline buckets, power shovels and the like, but on account of the great weight of the tractor and machinery carried thereby and the large area of contact of the traction belts with the ground considerable difficulty has been experienced in steering and moving the machine about in restricted areas. In a modification shown in Patent No. 1,422,082 of July 11, 1922 to Burke, it has been proposed to eliminate this difficulty to some extent by interposing a friction clutch and a friction brake between each traction belt and the prime mover, and providing an actuating lever controlled by the operator for operating either belt independently of the other to make a turn, and if necessary apply the brake to the idle belt to prevent movement thereof so that the machine will turn within a small compass or substantially the arc of a circle. In this arrangement of clutches and brakes the actuating means therefor has the disadvantage that considerable effort and skill is required on the part of the operator to move the same to the various positions.

One of the objects of the present invention, therefore, is to provide improved steering gear for tractors of the character described which shall have a common actuating member for the clutches and brakes by which the same may be readily moved to operative and inoperative positions and the brakes applied gradually by the operator and with comparatively little effort on his part.

Another object is to provide improved steering gear for tractors which has advantages over those used heretofore and by which the machine can be readily steered and moved within a small compass or substantially the arc of a circle.

Another object is to provide improved steering gear for tractors of the type described, which steering gear shall include a brake and a clutch associated with each traction belt and an actuator common to the brakes and clutches and adapted and arranged upon movement to various predetermined positions to move both clutches in and release both brakes, to move both clutches out and apply both brakes, or to move the clutch associated with one belt in and to partly or wholly apply the brake associated with the other belt and vice-versa, whereby the machine may be caused to travel straight ahead, to stop, or to turn in either direction through arcs of different radii.

Another object is to provide improved steering gear of the character described with means for indicating the various positions assumed by the actuator in steering.

Other objects and advantages will hereinafter appear.

Figure 2:
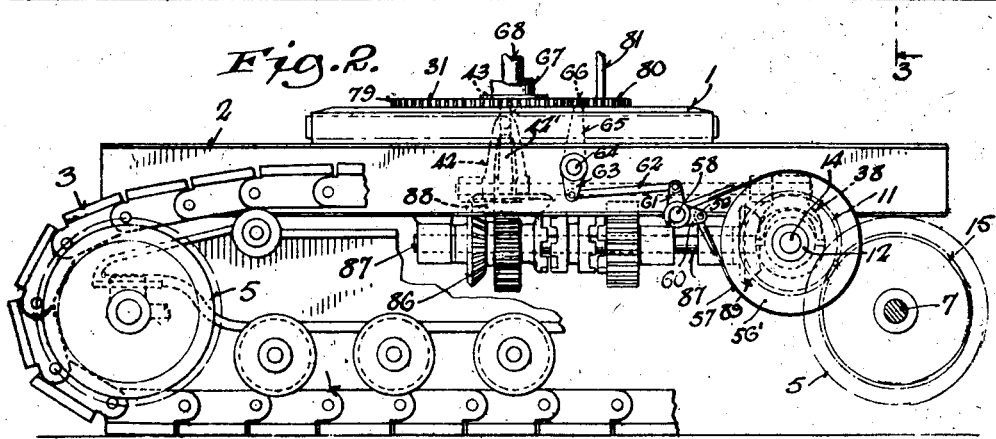
Figure 8:
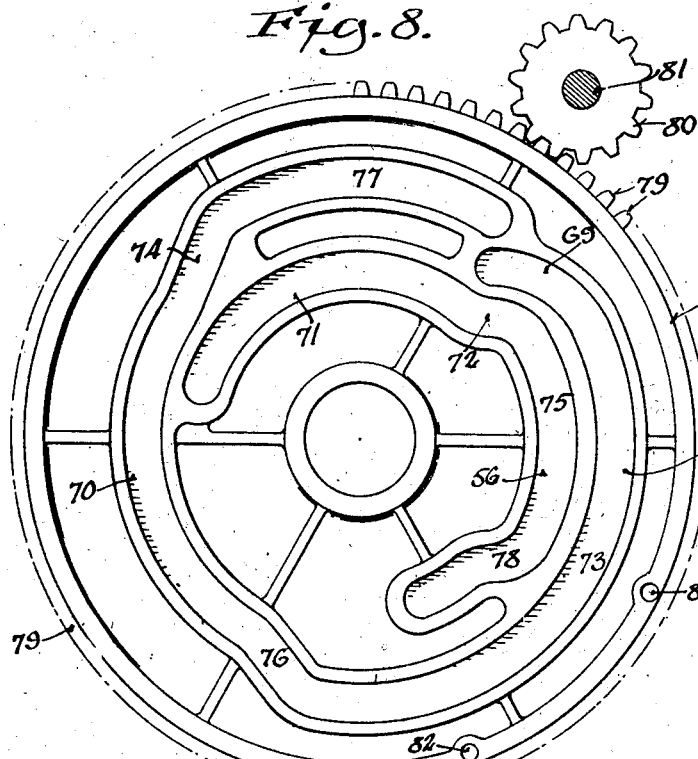
Figure 10:
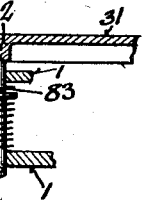
Figure 9:
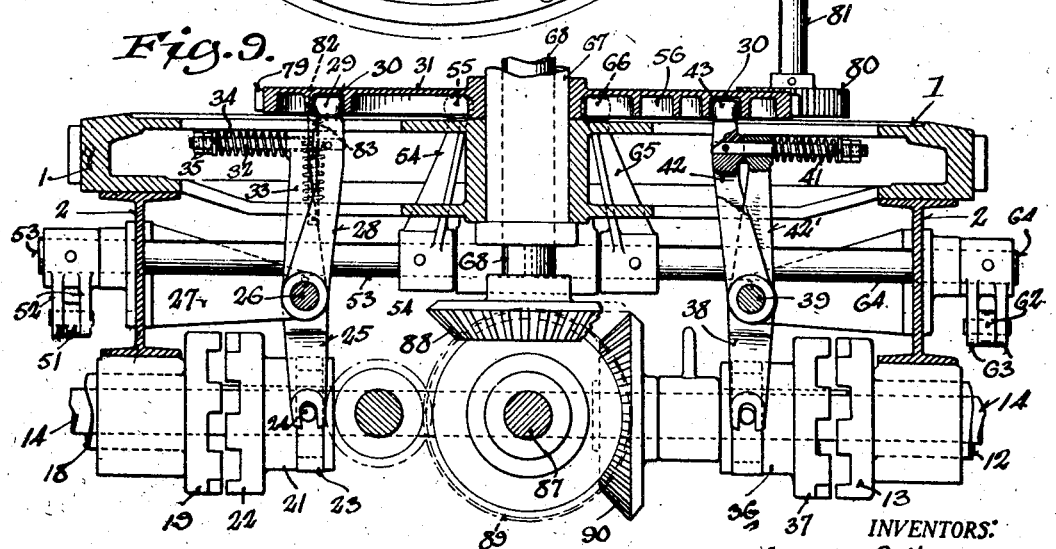

For the purpose of illustrating the invention an embodiment thereof is shown in the drawings, in which;

Figure 1 is a plan view;
Figure 2 is a front elevation;
Figure 3 is a section on line 3—3 of Fig. 1;
Figures 4, 5, 6 and 7 are views similar to Fig. 1, showing only the common actuating member for the clutches and brakes and the various positions to which it is moved in steering and stopping the machine;
Fig. 8 is an enlarged bottom plan view of the actuating member;
Fig. 9 is a section on line 9—9 of Fig. 1; and
Fig. 10 is an enlarged detail sectional view.

The tractor is of the usual construction and comprises a base 1 supported across suitable side frame members 2, and endless traction belts 3 and 4 mounted for movement over sprocket-wheels 5 and 6, respectively, fixed to shafts 7 and 8 journaled in suitable bearings 9 and 10. Sprockets 5 are operated by the gear 11 fixed on a sleeve 12 having a suitable clutch face 13, the sleeve being loosely mounted on shaft 14 and gear 11 in mesh with a gear 15 fixed to shaft 7. Sprockets 6 for turning belt 4 are operated in like manner by a gear 17 fixed to a sleeve 18 provided with a suitable clutch face 19 and loosely mounted on shaft 14, gear 17 being in mesh with a gear 20 fixed to shaft 8. Referring more particularly to Fig. 9, a clutch member 21 splined to shaft 14 is provided with a clutch face 22 and the usual collar 23 having trunnions 24 at opposite sides thereof which are engaged by the ends of the depending arms of a yoke 25 fixed to shaft 26 journaled in bearing members 27 secured to side frame member 2. Referring also to Figs. 1 and 3, a bifurcated arm 28 is loosely mounted on shaft 26 and provided at its upper end with a suitable roller 29 which fits within and traverses one of the cam grooves 30 of the common actuating means or member 31 for the brake and clutch members hereinafter more fully described, and a rod or bolt 32 fixed at one end thereof to arm 28 adjacent roller 29 and which passes through a suitable opening in the upper end of an arm 33 fixed to shaft 26, resilient or yieldable means such as a spring 34 being arranged upon the bolt between nuts 35 screwed to the free end thereof and arm 33.

From the foregoing it will be seen that by shifting arm 28 to the right as viewed in Fig. 9, spring 34 will be compressed and urge arm 33 also to the right to rotate shaft 26 and move clutch member 21 into engagement with clutch sleeve 18, the respective clutch faces 22 and 19 effecting a driving connection between shaft 14 and sprockets 6 through gears 17 and 20. If the clutch faces 22 and 19 should engage so that the teeth thereof do not mesh and movement of arm 28 to the right is continued, spring 34 will be further compressed and provide a yieldable connection or cushion until the teeth are in mesh and the clutch faces permitted to slip into driving engagement with each other. The yieldable means or spring 34 thereby prevents excessive strain upon the mechanism if the clutch faces engage when the teeth thereof are out of mesh.

The clutch and actuating mechanism therefor for connecting clutch sleeve 12 to shaft 14 is similar to that for connecting clutch sleeve 18 to the shaft. A clutch member 36 is splined to shaft 14 and provided with a suitable clutch face 37, the member being moved to operative and inoperative positions by means of a yoke 38 similar to yoke 25 fixed to shaft 39 and connected by means of a spring 41 to a bifurcated arm 42 similar to arm 28 loosely mounted on the shaft, the upper end of arm 42 being provided with a suitable roller 43 which fits into and traverses cam groove 30 of the common actuating member 31. Upon movement of arm 42 to the left as viewed in Fig. 9, spring 41 will be compressed and urge arm 42' also to the left to rotate shaft 39 and effect engagement of the clutch faces 37 and 13. The traction belt 3 will thereby be operatively connected to shaft 14. By properly shifting arms 28 and 42, therefore, either or both belts 3 and 4 may be connected to shaft 14 and the machine made to go straight ahead or to the left or right, as the case may be.

In making a turn by connecting one of the belts to the drive shaft and disconnecting the other belt therefrom, the disconnected belt frequently continues to move under the action of the connected belt, so that the machine does not make a sharp turn and in fact might even continue to travel straight ahead, depending upon conditions. To prevent this, therefore, a suitable brake is associated with each belt so that rotation thereof can be wholly or partly prevented while the other belt is moved through its connection with the drive shaft. The construction, arrangement and operation of these brakes will now be described.

Referring more particularly to Figs. 1, 2, 3 and 9, a brake drum 44 is fixed to shaft 14 adjacent gear 17 for driving belt 4 and embraced by a suitable brake band 45 having the free end 46 thereof bifurcated and anchored to a shaft 47 on opposite sides of an arm 48 fixed to the shaft and to which the other end of the brake band is pivotally connected. A second arm 50 is fixed to shaft 47 and connected by a link 51 to spaced lugs 52 fixed to a shaft 53. For the purpose of rotating shaft 53 to move arm 48 upwardly and thereby apply brake band 45 to drum 44, an arm 54 is fixed to shaft 53 and provided at its end with a suitable roller 55 which fits into and traverses cam groove 56 of actuating member 31. The brake and actuating mechanism therefor associated with belt 3 is of similar construction. A brake drum 56' is fixed to shaft 14 adjacent gear 11 and provided with a suitable brake band 57 having one end thereof anchored to a shaft 58 and the other end pivotally connected at 59 to the end of an arm 60 fixed to the shaft. A bifurcated arm 61, fixed to shaft 58 is connected by a link 62 to spaced lugs 63 fixed to a shaft 64 rotated by the shifting of an arm 65 fixed thereto and provided at its upper end with a suitable roller 66 fitted into and adapted to traverse the cam groove 56 of actuating member 31. By means of this construction and arrangement it is possible by shifting arms 54 and 65 to their various positions to apply either or both brake bands 45 and 57 to retard movement of either or both of the respective belts 4 and 3, respectively, or to lock both belts against any movement to thereby stop the machine.

The common actuating means or member 31 for shifting arms 28, 42, 54 and 65 to their respective operative and inoperative positions will now be described. Referring more particularly to Figs. 4, 5, 6, 7 and 8, the member 31 is fitted upon a suitable sleeve 67 for rotation about the axis of rotation of shaft 68 connected to the prime mover (not shown), this axis also being the axis of rotation of the excavator crane or other machinery mounted upon the tractor, which is the practice generally followed. Referring to Figs. 4 to 7, movement of rollers 29 and 43 toward each other will effect movement of clutch members 21 and 36, respectively, to operative position, and movement of rollers 55 and 66 to the left will effect movement of brake bands 45 and 57, respectively, to inoperative position. In the position of actuating member 31 shown in Fig. 4, rollers 29 and 43 are in their extreme inward positions while rollers 55 and 66 are in their extreme positions to the left. The clutch members 21 and 36 are then in operative position and the brake bands 45 and 57 released, so that the machine will move straight ahead.

The end portion 69 of cam groove 30 is offset inwardly and the portion 70 made concentric with shaft 68 so that rotation of member 31 in the direction of the arrow to the position shown in Fig. 5 will cause outward movement of roller 29 but no movement of roller 43. Clutch member 21 will then be in inoperative position so that belt 4 will be disconnected from the prime mover but belt 3 operated thereby to cause the machine to turn in the corresponding direction. The portion 71 of cam groove 56 is concentric with shaft 68 and the portion 72 offset so that upon movement of actuating member 31 to the position shown in Fig. 5, roller 55 will traverse portion 72 and move to the right to effect application of brake band 45 and retard or prevent movement of belt 4. During this movement of member 31 roller 66 will traverse the concentric portion 71 of cam groove 56 so that no movement thereof will occur. The end portion 69 of cam groove 30 and the offset portion 72 of cam groove 56 are so arranged that application of brake band 45 will not begin until clutch member 21 has been moved to inoperative position. The portion 72 is so shaped that roller 55 may be moved to the right gradually. The extent to which brake band 45 is applied can thereby be varied. This is important in moving the machine about in small arcs by connecting belt 3 to and disconnecting belt 4 from the prime mover, but permitting some movement of belt 4 by allowing brake band 45 to slip the proper amount.

The portion 73 of cam groove 30 is concentric with shaft 68 and the portion 74 offset so that upon movement of actuating member 31 in the direction of the arrow from the position of Fig. 5 to that of Fig. 6, roller 29 will remain in its outer position and roller 43 made to traverse portion 74 and to move outwardly so that both clutch members 21 and 36, respectively, will be in inoperative position. During this movement, roller 66 will traverse the offset portion 72 of cam groove 56 to effect application of brake band 56. Roller 55 will traverse the portion 75 of cam groove 56 concentric with shaft 68, so that no movement of this roller will occur and brake band 45 associated therewith will remain in operative position to prevent movement of belt 4. In the position of actuating member 31 as shown in Fig. 6, therefore, both clutches will be out or in inoperative position and both brakes applied. This position of member 31 and the clutches is also shown in Fig. 9. Portion 74 of cam groove 30 is so arranged that roller 43 will be moved outwardly to throw out clutch member 36 before roller 66 starts to traverse portion 72 to effect application of brake band 57, portion 72 permitting gradual application of the brake band if so desired.

Further movement of actuating member 31 in the direction of the arrow to the position shown in Fig. 7 will cause roller 29 to traverse the inwardly offset portion 76 of cam groove 30 and to move inwardly to its original position as shown in Fig. 4, in which position clutch member 21 is in operative position. During this movement of member 31, roller 43 will traverse the portion 77 of cam groove 30 which is concentric with shaft 68, so that no movement of this roller will occur and clutch member 36 will remain in inoperative position. As shown in Fig. 7, roller 55 will traverse the inwardly offset portion 78 of cam groove 56 and be returned to its initial position as shown in Fig. 4, in which position brake band 45 associated therewith is released and belt 4 free to move. Roller 66 will traverse the portion 75 of cam groove 56 concentric with shaft 68 and will remain in its outermost position as shown in Fig. 6, in which position brake band 57 is applied and belt 3 held against movement. In the position of actuating member 31 as shown in Fig. 7, therefore, brake band 57 is applied to hold or lock belt 3 against movement and clutch member 21 held in operative position to connect belt 4 to the prime mover to cause the machine to turn in the opposite direction to that corresponding to the position of the actuating member shown in Fig. 5, in which position belt 4 is held against movement while belt 3 is connected to the prime mover.

Portion 76 of cam groove 30 and portion 78 of cam groove 56 are so arranged that brake band 45 will be released before clutch member 21 is thrown in.

For the purpose of rotating actuating member 31, the same is provided at the periphery thereof with gear teeth 79 with which a gear wheel 80 is in mesh, the latter being fixed to the lower end of shaft 81. Shaft 81 extends up through the rotatable platform of the machine and is journaled for rotation with respect thereto, the upper end of the shaft being provided with a handwheel or the like (not shown) for operating the steering gear. The platform of the excavator upon which the various excavating machinery is mounted is capable of complete rotation about the axis of shaft 68. During this rotary movement of the excavator gear 80 may be allowed to rotate freely and travel around member 31 or it may be moved out of mesh with the teeth 79 of member 31 in any suitable manner to prevent this idle rotary movement of the gear and shaft 81 therefor and possible injury to the operator. It will therefore be seen that the steering gear may be operated regardless of the position of the platform and that rotation of the latter does not affect its adjustment.

Member 31 may be provided on the under side thereof with recesses 82 for coaction with a detent 83 or the like slidably mounted in any suitable manner in base 1, as more clearly shown in Fig. 10, and urged upwardly into engagement with the member by means of a spring 84 arranged thereon between base 1 and a suitable stop 85, the detent being arranged to enter or coact with the recesses and indicate to the operator that the actuating member 31 is in the position shown in Fig. 5 or Fig. 6. The ends of cam grooves 30 and 56 provide stops to indicate to the operator that member 31 is in the position shown in Fig. 4 or Fig. 7.

It will therefore be seen that by rotating actuating member 31 to the various positions shown in Figs. 4 to 7, the following combinations or positions of the clutches and brakes may be obtained; both clutches in and both brakes out for driving straight ahead, both clutches out and both brakes in or applied to stop the machine, and the clutch for one belt in and the brake for the other belt partly or wholly applied or vice-versa to turn in either direction in a small compass or substantially the arc of a circle. So far as applicants are aware no steering gear of this type has ever been provided having this great flexibility and range of operation and adapted to selectively operate the clutches and brakes in the manner and for the purpose described above and in which definite indication is afforded the operator as to the various positions of the parts.

Shaft 14 may be connected to drive shaft 68 in any suitable way such as by a bevel gear 86 fixed to shaft 87 and meshing with a bevel gear 88 fixed to shaft 68, and a bevel gear 89 fixed to shaft 87 and meshing with a bevel gear 90 fixed to shaft 14.

Various changes in the size, shape and arrangement of the parts may be adopted without departing from the spirit of the invention or the scope of the claims.

The invention claimed is:

1. In a tractor of the character described, a frame, endless belts arranged at either side of said frame, a prime mover supported by said frame, a clutch associated with each of said belts and adapted to connect the same with said prime mover, a brake associated with each of said belts and adapted to retard movement thereof with respect to said frame, members connected to said clutches and said brakes for actuating the same, and a cam member provided with grooves receiving the ends of said members and adapted to cooperate therewith to effect positive movement of said clutches and brakes to their respective operative and inoperative positions.

2. In steering gear of the character described, a plurality of clutches, a plurality of brakes, operating levers therefor, actuating means co-operating with said lever and common to said clutches and brakes adapted upon movement to various predetermined positions to move said clutches and brakes to their respective operative and inoperative positions, and a spring-pressed detent associated with said actuating means and adapted to cooperate therewith to provide means for indicating the various positions of the latter.

3. The combination with a tractor comprising a frame and traction belts at either side thereof, a prime mover supported by said frame, a clutch associated with each of said belts and adapted to connect the same to said prime mover, and a brake associated with each of said belts and adapted to retard or prevent movement thereof, of actuating means common to said clutches and said brakes and adapted upon movement to a predetermined position to move both of said clutches to operative position and to release both of said brakes and upon movement to a second predetermined position to move both of said clutches to inoperative position and to apply both of said brakes and upon movement to a third predetermined position to move the clutch and brake associated with one of said belts to operative and inoperative positions respectively and the clutch and brake associated with the other of said belts to inoperative and operative positions respectively and upon movement to a fourth predetermined position to effect a result opposite to that of said third position.

4. In steering gear of the character described, the combination with a tractor comprising a frame and traction belts at either side thereof, a prime mover supported by said frame, and a drive shaft connected to said prime mover, of a sleeve loosely mounted on said shaft adjacent each of said belts and provided with a gear operatively connected to said belt and a friction brake adapted to retard or prevent rotary movement of said sleeve, clutch members splined to said shaft and arranged for cooperation with said sleeves to connect the same to said shaft for rotation therewith, operating levers for said clutches and brakes, and a rotary cam member cooperating with said levers and common to said clutches and said brakes and adapted upon movement to various predetermined positions to effect movement of said clutches and said brakes to their respective operative and inoperative positions whereby said tractor may be driven straight ahead or to the right or left in large or small arcs or stopped.

5. The combination with the endless traction belts of a tractor, and driving and braking means associated therewith, of a single means at the control of the operator for actuating said first-named means in such wise as to cause said tractor to be either driven straight ahead, stopped, or turned to the right or to the left through arcs of various radii, and means for releasably holding said actuating means in position for effecting certain of said operations.

6. In a tractor of the class described, a frame, traction belts at either side thereof, a driving axle arranged transversely of said frame for driving said belts, clutches associated with said axle whereby either or both belts may be driven, brakes also associated with said axle for retarding or preventing movement of either or both of said belts, an operating lever for each of said brakes and clutches, a vertically disposed drive shaft for driving said axle, a disc-like member rotatably associated with said shaft, said member having cam ways formed therein for receiving the free ends of said levers and means for rotating said member to thereby actuate said brakes and clutches.

7. In steering gear of the character described, a plurality of clutches, a plurality of brakes, actuating members for said clutches and brakes, and a rotary cam member provided with substantially concentrically arranged cam ways receiving the ends of all of said actuating members and adapted upon rotation to effect positive application and release of said clutches and brakes.

8. In steering gear of the character described, the combination with a tractor having side frame members, endless traction belts therefor, a drive shaft, driving connections between said shaft and said belts, said connections being supported by said frame members and including clutches for connecting and disconnecting either or both of said belts to and from said shaft, and actuating levers for said clutches, of shafts rotatably supported by said frame members and extending outwardly beyond the same, brakes for said belts, connections between the outer ends of said shafts and said brakes for operating the latter upon rotary movement of said shafts, levers fixed to said shafts, and a member provided with cam ways receiving the respective ends of said levers and shaped to effect movement thereof and operation of said clutches and brakes upon movement of said member to various positions of adjustment.

9. In a tractor of the class described, a frame, traction belts at either side thereof, a driving axle arranged transversely of said frame for driving said belts, clutches associated with said axle whereby either or both belts may be driven, brakes also associated with said axle for retarding or preventing movement of either or both of said belts, an operating lever for each of said brakes and clutches, said levers terminating at their free ends in a common plane, and a disc-like member rotatably mounted in said plane and provided with cam ways for receiving said ends of said levers, and means for rotating said disc-like member to actuate said levers.

10. In a tractor of the class described, a frame, traction belts at either side thereof, a driving axle arranged transversely of said frame for driving said belts, clutches associated with said axle whereby either or both belts may be driven, brakes also associated with said axle for retarding or preventing movement of either or both of said belts, an operating lever for each of said brakes and clutches, a vertically disposed drive shaft for driving said axle, a disc-like member rotatably associated with said shaft, said member having cam ways formed therein for receiving the free ends of said levers and means for rotating said member to thereby actuate said brakes and clutches, said cam ways being so formed and arranged that upon rotation of said disc-like member said tractor may be driven either straight ahead, stopped, or turned to the right or to the left through arcs of varying radii.

11. In a tractor of the class described, a frame, traction belts at either side thereof, a driving axle arranged transversely of said frame for driving said belts, clutches associated with said axle whereby either or both belts may be driven, brakes also associated with said axle for retarding or preventing movement of either or both of said belts, an operating lever for each of said brakes and clutches, a vertically disposed drive shaft for driving said axle, a disc-like member rotatably associated with said shaft, said member having cam ways formed therein for receiving the free ends of said levers and means for rotating said member to thereby actuate said brakes and clutches, said cam ways being arranged substantially concentrically in a common plane and provided with irregularities for effecting the actuation of said brakes and clutches selectively and in predetermined order.

12. In a tractor of the class described, a frame, traction belts at either side thereof, a driving axle arranged transversely of said frame for driving said belts, clutches associated with said axle whereby either or both belts may be driven, brakes also associated with said axle for retarding or preventing movement of either or both of said belts, an operating lever for each of said brakes and clutches, a vertically disposed drive shaft for driving said axle, a disc-like member rotatably associated with said shaft, said member having cam ways formed therein for receiving the free ends of said levers and means for rotating said member to thereby actuate said brakes and clutches, said cam ways being arranged substantially concentrically in a common plane and being so formed and arranged that upon rotation of said disc-like member said tractor may be either driven straight ahead, stopped, or turned to the right or to the left through arcs of varying radii.

13. Steering gear for tractors of the character described comprising a pair of clutches, a pair of brake members, operating levers for the clutches, operating levers for the brake members, and a single rotary cam member cooperable with all of the levers and having means for coordinating the action of the brake members and clutches to steer the tractor in either direction and also having means coacting with the levers for controlling the clutches and brake members independently of each other to cause the tractor to be driven straight ahead with the brakes released or to cause the tractor to be stopped with the clutches disengaged and both brakes set.

14. In a tractor of the character described, a frame, a prime mover supported thereby, endless belts at the sides of the frame, a driving element for each endless belt, a clutch interposed between the prime mover and each driving element for controlling the actuation of each endless belt, each clutch including a pair of cooperable clutch members, one clutch member of each pair being freely shiftable to a clutching or unclutching position and being adapted to remain in the position to which it is adjusted, an operating lever connected to each shiftable clutch member and constituting the sole means whereby movement may be imparted thereto, a brake member operatively associated with each driving element for retarding and arresting motion thereof, an operating lever for each brake member, and a single rotary cam member cooperable with all the levers and having means coacting with the levers for coordinating the action of the brake members and clutches to steer the tractor in either direction and also having means for controlling the clutches and brake members independently of each other to cause the tractor to be driven straight ahead with the brakes released or to cause the tractor to be stopped with the clutches disengaged and both brakes set, the means on said cam member which coacts with the levers associated with the clutch members operating to positively shift the clutch members in either direction.

15. A steering gear of the character described comprising a plurality of clutches, a plurality of brakes, rotary control means common to all of said clutches and brakes and motion transmission means between the rotary control means and the clutches and brakes, said rotary control means being operable to effect selectively through the motion transmission means, engagement of all of the clutches and release of all the brakes simultaneously, and disengagement of all of the clutches and application of all of the brakes simultaneously.

16. A steering means of the character described comprising a plurality of clutches, a plurality of brakes, a rotary cam member common to all of said clutches and brakes and motion transmission means between the rotary cam member and the clutches and brakes, said rotary cam member being operable to effect selectively through the motion transmission means, engagement of all of the clutches and release of all of the brakes simultaneously, disengagement of all of the clutches and application of all of the brakes simultaneously, and disengagement of any clutch and application of a brake simultaneously.

17. A tractor of the character described comprising a frame, a prime mover supported thereby, endless belts at the sides of the frame, a clutch associated with each endless belt and adapted to connect the same with said prime mover, a brake associated with each of said belts and adapted to retard movement thereof with respect to said frame, operating devices for the clutches and brakes, and rotary actuating means common to the operating devices for all of said clutches and brakes for selectively engaging all the clutches and releasing all the brakes simultaneously, disengaging all the clutches and applying all the brakes simultaneously, and disengaging either clutch and applying its associated brake.

18. In steering gear of the character described, the combination of a plurality of clutches, a brake member associated with each of said clutches, and a cam member adapted to effect movement of said clutches to operative and inoperative positions simultaneously or independently and movement of said brake members to inoperative and operative positions simultaneously or independently, said cam member effecting positive and gradual application and release of said brake members.

19. A steering gear for tractors of the character described having clutches and brakes controlling the steering movements, operating levers for the clutches and brakes, and a single cam member provided with a plurality of co-ordinated cam-ways adapted to receive and actuate co-ordinately the clutch and brake levers through a predetermined series of operations.

20. A steering gear for tractors of the character described having clutches and brakes controlling the steering movements, operating levers for the clutches and brakes, a single disc-like cam member provided with a plurality of co-ordinated cam-ways concentrically arranged in a common plane and adapted to receive and actuate co-ordinately brake and clutch levers through a predetermined series of operations.

21. A steering gear for tractors of the character described having a plurality of clutches, a plurality of brakes, operating levers for the clutches and brakes, a single rotary cam having cam-ways receiving the ends of the operating levers and actuating to impart control movements to the control levers, the ends of the cam-ways engaging the levers to indicate certain operative adjustments of the cam member and means for releasably holding the cam member in intermediate positions to indicate other operative adjustments of the cam member.

In witness whereof we hereto affix our signatures.

ARTHUR G. HENRICKS.
HOLGER L. MITCHELL.